(12) United States Patent
Wu et al.

(10) Patent No.: US 7,615,891 B2
(45) Date of Patent: Nov. 10, 2009

(54) SYSTEMS FOR AND METHODS OF CONTROLLING OPERATION OF A UPS

(75) Inventors: Jia Wu, Chelmsford, MA (US); James Simonelli, Grafton, MA (US); Matthew F. Bush, Tyngsboro, MA (US)

(73) Assignee: American Power Conversion Corporation, West Kingston, RI (US)

( * ) Notice: Subject to any disclaimer, the term of this patent is extended or adjusted under 35 U.S.C. 154(b) by 71 days.

(21) Appl. No.: 11/960,372

(22) Filed: Dec. 19, 2007

(65) Prior Publication Data

US 2009/0160254 A1 Jun. 25, 2009

(51) Int. Cl.
*H02J 7/00* (2006.01)
(52) U.S. Cl. ........................................ 307/66
(58) Field of Classification Search .................... 307/66
See application file for complete search history.

(56) References Cited

U.S. PATENT DOCUMENTS

| | | | |
|---|---|---|---|
| 5,371,666 A | 12/1994 | Miller | |
| 6,169,669 B1 * | 1/2001 | Choudhury | 363/37 |
| 2002/0130648 A1 | 9/2002 | Raddi et al. | |
| 2007/0170910 A1 | 7/2007 | Chang et al. | |

OTHER PUBLICATIONS

Seung K. Sul, and Thomas A. Lipo, "Design and Performance of a High-Frequency Link Induction Motor Drive Operating at Unity Power Factor", IEEE Transactions on Industry Applications, vol. 26, No. 3, May/Jun. 1990, pp. 434-440.
Thomas G. Habetler, "A Space Vector-Based Rectifier Regulator for AC/DC/AC Converters", IEEE Transactions on Power Electronics, vol. 8, No. 1, Jan. 1993, pp. 30-36.
Zhiqiang Jiang et al: "Fast controller based on active-power-feed-forward for PFC converter applied to UPS" , Applied Power Electronics Conference and Exposition, 2005. APEC 2005. Twentieth Annual IEEE Austin, TX, USA Mar. 6-10, 2005, Piscataway, NJ, US, IEEE, US, vol. 1, Mar. 6, 2005, pp. 537-540.
Che-Hung Lai et al: "DSP-embedded ups controller for high-performance single-phase on-line UPS systems" IECON-2002. Proceedings of the 28th Annual Conference of the IEEE Industrial Electronics Society. Sevilla, Spain Nov. 5-8, 2002; [Annual Conference of the IEEE Industrial Electronics Society], IEEE, New York, NY, US, vol. 1, Nov. 5, 2002, pp. 268-273.
Chiang S J et al: "Design and implementation of a single phase three-arms rectifier inverter" IEE Proceedings: Electric Power Applications, Institution of Electrical Engineers, GB, vol. 147, No. 5, Sep. 8, 2000, pp. 379-384.
International Search Report for the corresponding PCT Application PCT/2008/085392 mailed Apr. 16, 2009.

\* cited by examiner

*Primary Examiner*—Robert L. DeBeradinis
(74) *Attorney, Agent, or Firm*—Lando & Anastasi, LLP

(57) ABSTRACT

A UPS includes an AC output, power factor control circuitry; and a DC bus coupled to the power factor control circuitry where the power factor control circuitry is configured to determine a difference in instantaneous power supplied to the AC output and to adjust a voltage of the DC bus based, at least partly, on the difference. In one embodiment, the UPS includes a single phase AC input. In another embodiment, the power factor control circuitry is configured to determine a cumulative difference in instantaneous power supplied to the AC output.

35 Claims, 5 Drawing Sheets

SYSTEMS FOR AND METHODS OF CONTROLLING OPERATION OF A UPS

BACKGROUND OF INVENTION

1. Field of Invention

Embodiments of the invention relate generally to uninterruptible power supplies ("UPS"). More specifically, at least one embodiment relates to a system and method for controlling a DC bus voltage of a UPS.

2. Discussion of Related Art

Because electrical systems are dynamic in nature, control systems employed with power conversion circuitry are generally responsive to changes in the electrical systems. Different approaches may be employed to address various types of changes, for example, transient or steady state changes, changes in voltage and/or current, changes in the connected load, combinations of the preceding examples, etc.

Today, power factor correction of power conversion circuitry (i.e., the phase relation between the current and the voltage used by the power conversion circuitry) is a significant design consideration. In practice, power factor can be improved by reducing harmonics generated by the power conversion circuitry during operation. Generally, power conversion circuitry designed for reduced harmonics, however, must employ a voltage control loop that has a relatively slow response time. The slow response time results in a poor transient response including wider deviations from nominal voltages, for example, greater overshoot and undershoot of a DC bus voltage. Thus, circuit designers attempt to provide a system with acceptable power factor control and acceptable dynamic response while meeting the requirements of applicable harmonic standards.

In the case of a single phase UPS, designers generally provide a control scheme (e.g., DC voltage loop control) with relatively slow frequency response (well below the line frequency of the AC input) in order to meet the harmonic standards. That is, a feedback control system is employed in which the DC bus voltage is compared to a setpoint and adjustments made based on an error between the measured DC bus voltage and the setpoint. The result of the design tradeoff included in this approach is that the DC bus voltage has a relatively poor transient response. The poor transient approach can result in large overvoltages and undervoltages on the DC bus as the DC bus voltage varies, for example, in response to changes in the loading of the UPS output.

Other power conversion applications that use a DC link or bus also face the need to control the transient response of the DC bus in a dynamic system, for example, switch mode power supplies, voltage regulators and motor drives to name a few. Some more recent approaches to the above-described problem in single phase power factor control are a "notch filter method" and a "dead zone digital control method." Neither of these approaches is satisfactory in a UPS application. For example, the notch filter method is most suitable where a substantially fixed line frequency is found. For this reason, the notch filter method is impractical because many UPS applications do not operate in environments that meet the preceding requirement. The "dead zone" approach is not suitable for many UPS applications because it is not suited for a system in which the DC bus supplies power to an inverter which is connected to a non-linear load, such as a computer load.

Some prior motor control systems have employed a feedforward scheme in which average power at the output of the power conversion circuitry is employed in regulating a DC bus voltage. These approaches, however, are employed in three phase motor control in which the instantaneous load power sums to zero because the motor provides a polyphase, balanced and linear load.

SUMMARY OF INVENTION

At least one aspect of the invention provides an effective approach for dynamic control of voltage on a DC bus used in power conversion circuitry. According to one embodiment, data concerning changes in the load supplied by the power conversion circuitry is used to control a transient response of the DC bus voltage. In a further embodiment, a difference between instantaneous load power measured during a first cycle and instantaneous power measured during a second cycle is accumulated and the voltage of the DC bus is controlled based on the accumulated difference. According to one embodiment, the preceding approach is employed in a single phase system. In a further embodiment, the preceding approach is employed in controlling a transient response of a DC bus voltage of a UPS having a single phase AC input. In accordance with one embodiment, the approach provides for a transient response time of the DC bus voltage of significantly less than one cycle. In another embodiment, the transient response time of the DC bus voltage substantially equals one-half cycle. In a further embodiment, the transient response time of the DC bus voltage is significantly less than one-half cycle. Accordingly, at least one aspect of the invention can reduce voltage "excursions" (i.e., overshoots and undershoots). In one embodiment, an electrical rating of power electronic devices included in power conversion circuitry can be reduced because peak voltages are reduced, for example, a voltage rating of devices connected to the DC bus may be reduced.

In accordance with one aspect, the invention provides a method of controlling a voltage of a DC bus included in an uninterruptible power supply. The UPS includes power factor control circuitry coupled to the DC bus and an AC output. The method includes acts of determining a difference between instantaneous power supplied to the AC output at a first time and instantaneous power supplied to the AC output at a second time and adjusting an operation of the power factor control circuitry to adjust the voltage of the DC bus based, at least partly, on the difference. In one embodiment, the method includes an act of controlling a power factor of a single phase AC input of the UPS. In another embodiment, the method includes an act of determining a cumulative difference in instantaneous power supplied at the AC output. In a further embodiment, the method includes an act of providing the cumulative difference to the power factor control circuitry. In yet a further embodiment, the method includes an act of comparing the cumulative difference to a predetermined threshold. In another embodiment, the method includes an act of adjusting the operation of the power factor control circuitry to adjust the voltage of the DC bus when the cumulative difference exceeds the predetermined threshold.

In accordance with another aspect, a UPS includes an AC output, power factor control circuitry, and a DC bus coupled to the power factor control circuitry where the power factor control circuitry is configured to determine a difference in instantaneous power supplied to the AC output and to adjust a voltage of the DC bus based, at least partly, on the difference. In one embodiment, the UPS includes a single phase AC input. In another embodiment, the power factor control circuitry is configured to determine a cumulative difference in instantaneous power supplied to the AC output. In a further embodiment, the cumulative difference is determined based on a comparison of instantaneous power determined at a plurality of points in a first cycle of an AC waveform and instantaneous power determined at a plurality of points in a second cycle of the AC waveform.

In accordance with another aspect, a UPS includes a DC bus, an AC output and means, coupled to the DC bus, for controlling a voltage of the DC bus based on a difference in instantaneous power supplied to the AC output. In one embodiment, the means for controlling include means for determining a cumulative difference in instantaneous power supplied to the AC output. In another embodiment, the cumulative difference is determined based on a comparison of instantaneous power determined at a plurality of points in a first cycle of an AC waveform and instantaneous power determined at a plurality of points in a second cycle of the AC waveform.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
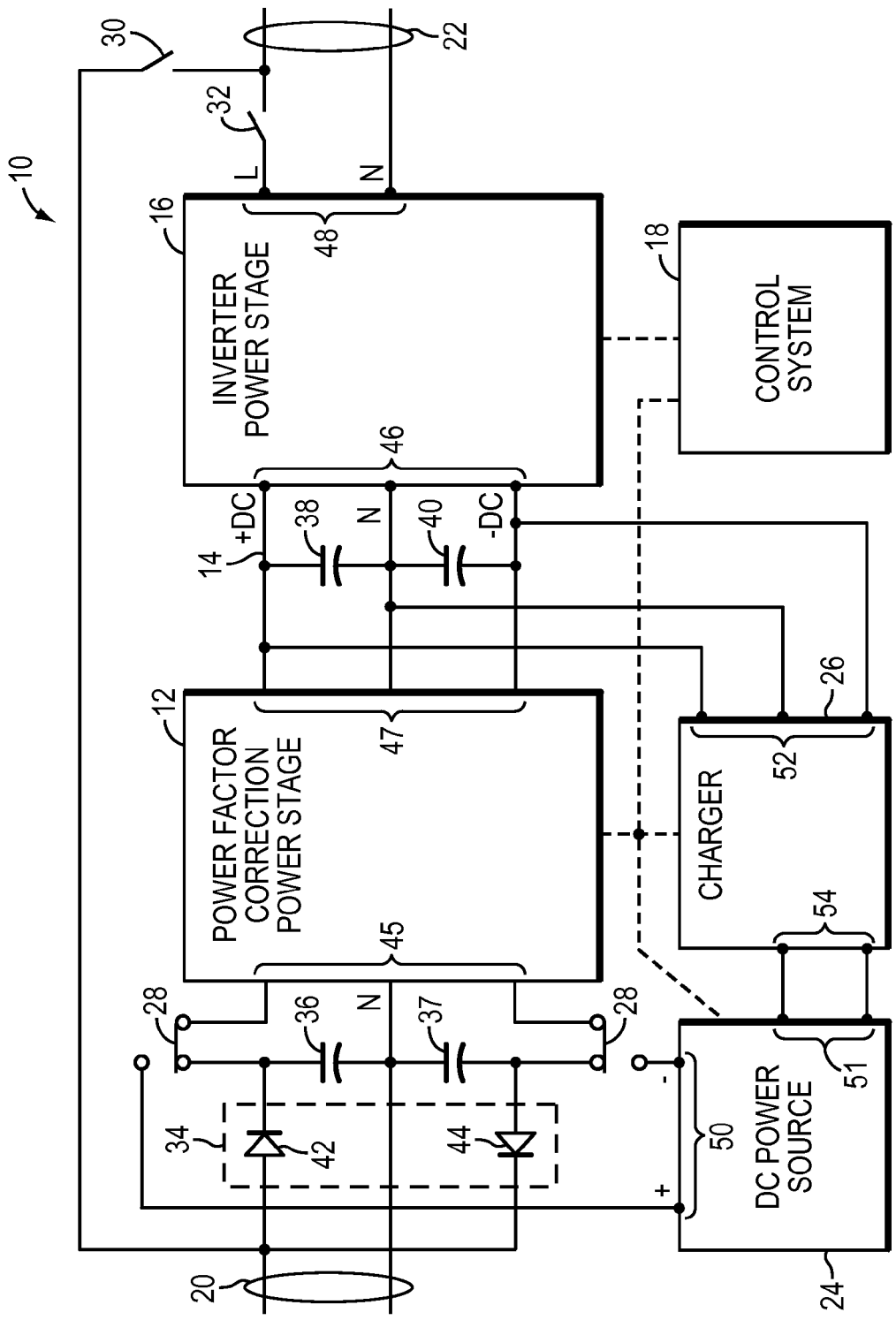
FIG. 1 is a block diagram of a UPS in accordance with one embodiment.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

FIG. 1 illustrates a block diagram of an embodiment in which a control system is employed to regulate a voltage on a DC bus of power conversion equipment through various changes in the loading of the equipment, e.g., through load transients that occur at the output. In accordance with one embodiment, a UPS 10 includes a power factor correction stage 12, a DC bus 14, an inverter power stage 16, a control system 18, an AC input 20, an AC output 22, a DC power source 24, and a charger 26. In addition, the UPS may include a pair of switches 28, a bypass switch 30 and an isolation switch 32. Further, the UPS 10 may include a rectifier 34, a first input capacitor 36, a second input capacitor 37, a first DC bus capacitor 38 and a second DC bus capacitor 40. The rectifier 34 may include a first diode 42 and a second diode 44.

In accordance with one embodiment, the power factor correction power stage 12 includes an input 45 and an output 47, the inverter power stage 16 includes an input 46, the DC power source 24 includes an input 51 and an output 50, and the charger 26 includes an input 52 and an output 54.

As used herein, the term "DC bus" is used to generally describe a DC electrical circuit that supplies DC power to additional circuitry. According to one embodiment, a DC bus may include a dual DC bus, for example, where each of the positive DC bus and the negative DC bus are referenced to a neutral. According to another embodiment, a DC bus may include a single DC bus, for example, a DC bus in which the positive DC bus and the negative DC bus are not referenced to a neutral. The term DC bus is not employed to describe a particular type of conductor, but may include any type of conductor including wire, solder trace, cable, bus bar, etc.

In operation, the UPS 10 receives an AC input (e.g., a single phase AC input) at the input 20. The AC input is rectified by the rectifier 34 and supplied to the power factor correction power stage 12. According to one embodiment, the power factor correction power stage 12 includes solid state switches that are selectively operated to apply power to the DC bus 14. Further, the switching cycles of the solid state switches can vary depending upon the amount of load that is being supplied at the AC output 22 of the UPS. As is well known by those of ordinary skill in the art, the power factor correction power stage 12 alternately supplies power to the positive DC bus and the negative DC bus. During various stages of a switching cycle, the capacitor 38 associated with the positive DC bus is charged. In other stages of the switching cycle, the capacitor 40 associated with the negative DC bus is charged. Power from the DC bus is supplied to the input 46 of the inverter power stage 16. The inverter power stage 16 converts the DC to an AC output at the output of the inverter power stage 48. In the illustrated embodiment, the inverter power stage provides a single phase AC output, however, in various embodiments, the inverter power stage may supply a polyphase output, for example, a three phase output which may or may not include a neutral.

The DC power source 24 is employed in one embodiment as an alternate power source to supply power to the power factor correction power stage when the AC power source is unavailable. The pair of switches 28 can operate to switch between a first position and a second position. In the first position the output 50 of the rectifier 34 is connected to the input 45 of the power factor correction power stage 12. In a second position the output 50 of the rectifier 34 is disconnected and the output 50 of the DC power source is connected to the input 45 of the power factor correction power stage 12.

In accordance with one embodiment, the charger input 52 is connected to the DC bus 14 and the charger output 54 is connected to an input of the DC power source 51. In accordance with one embodiment, the DC power source is a battery power source and the charger 26 is a battery charger. However, in other embodiments, other power sources may be used, for example, super capacitors, fuel cells, and the like.

The control system 18 may, in various embodiments, include one or more control devices. In one embodiment, the control devices include electronic circuitry. In one embodiment, a complete control system 18 is included in a digital signal processor. In a further embodiment, some elements of the control system 18 are included in a digital signal processor while other elements of the control system 18 are included elsewhere. In one embodiment, the control system 18 is included in a TMS320F2810 digital signal processor manufactured by Texas Instrument.

Figure 2:
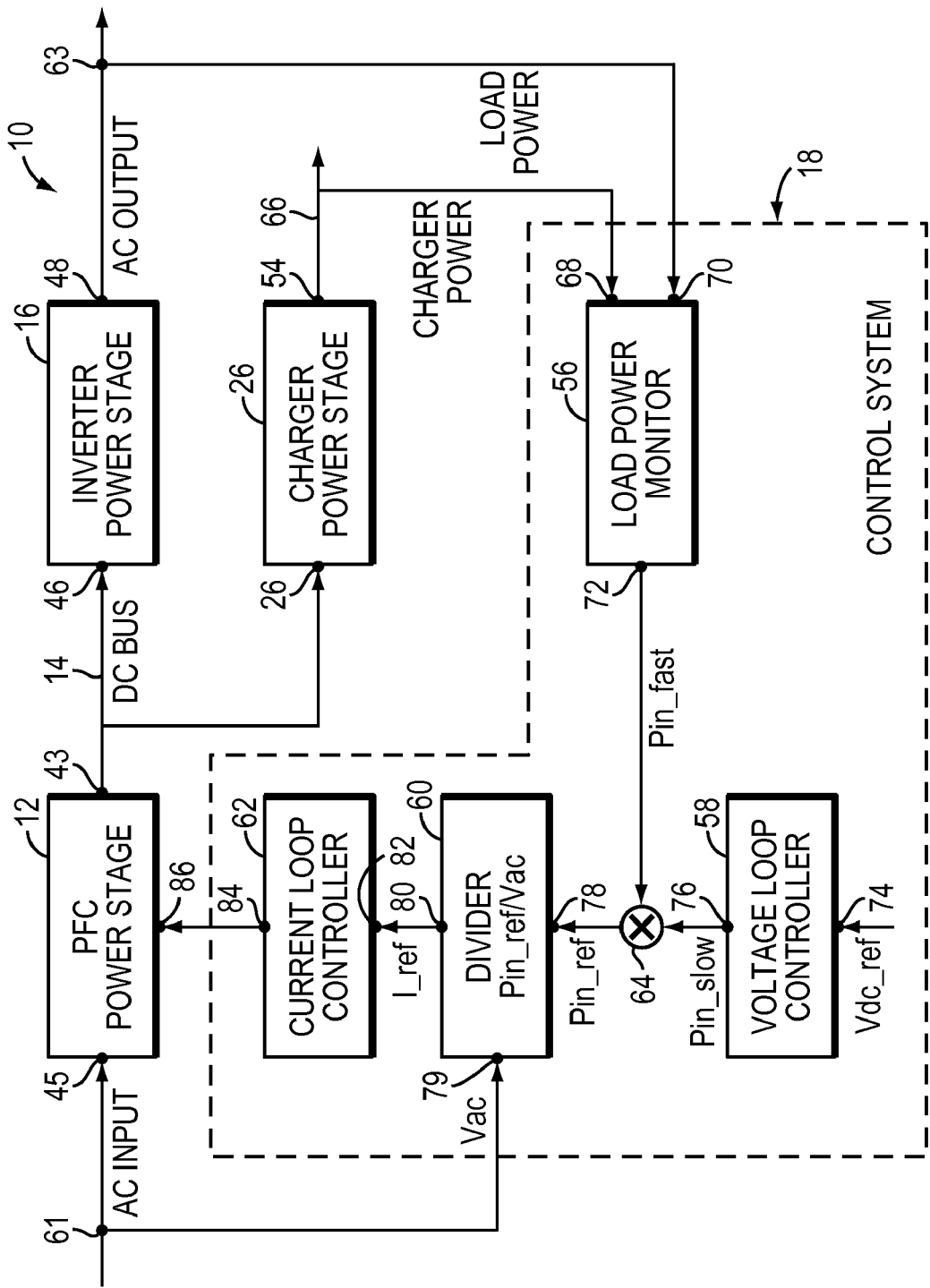
FIG. 2 is a block diagram of the UPS of FIG. 1 including further details of a control system of the UPS illustrated in FIG. 1 in accordance with one embodiment.

Referring now to FIG. 2, a high level block diagram of the UPS 10 including further details of the control system 18 is illustrated. The UPS 10 includes the power factor correction power stage 12, the inverter power stage 16 and the charger power stage 26. In accordance with one embodiment, the UPS 10 also includes an AC input 61, an AC output 63 and a second DC bus 66. In one embodiment, the second DC bus 66 connects the charger 26 to a DC power source, for example, a battery power source. The control system 18 includes a load power monitor 56, a voltage loop controller 58, a divider 60 and a current loop controller 62. The control system also includes a node 64. In one embodiment, the node 64 is a summing node of the control system. In accordance with one embodiment, the input 45 of the power factor correction power stage 12 is connected to a source of AC power, the output 43 of the power factor correction power stage is connected to the DC bus 14. In addition, in one embodiment, the input 46 of the inverter power stage is connected to the DC bus 14 and the output 48 of the inverter power stage 16 is connected to the AC output 63 of the UPS 10. Further, the input 26 of the charger power stage is connected to the DC bus 14 and the output 54 of the charger power stage is connected to a second DC bus 66.

In one embodiment, the AC output 63 and the output 48 of the inverter power stage are the same point electrically, that is, the output 48 is the AC output of the UPS 10. In another embodiment, the AC input 61 and the input 45 of the power factor correction power stage 12 are the same point electrically.

In one embodiment, the load power monitor 56 includes a first input 68, a second input 70 and an output 72. In a further embodiment, the first input 68 is connected to the second DC bus 66 and the second input 70 is connected to the AC output 63 of the UPS 10. The voltage loop controller 58 can include an input 74 and an output 76. The divider 60 includes a first input 78, a second input 79 and an output 80. According to one embodiment, the second input 79 is connected to the AC input 61 of the UPS 10. The current loop controller 62 includes an input 82 and an output 84. In accordance with one embodiment, the power factor correction power stage 12 includes an input 86 that is connected to the output 84 of the current loop controller 62.

In various embodiments, each of the first input 68 and the second input 70 are supplied information concerning the voltage and current at each of the respective circuits to which they are connected, i.e., the second DC bus 66 and the AC output 63, respectively. According to one embodiment, the first input 68 and the second input 70 are supplied one or more of the line voltage(s) and the line current(s) from which instantaneous power is determined. In other embodiments, either or both of the line voltage(s) and the line current(s) are supplied to the load power monitor 56 after being converted by transducers, e.g., current sensors, voltage transducers, etc.

In accordance with one embodiment, the input 74 of the voltage loop controller is supplied a signal used as a DC reference voltage by the control system 18. The node 64, in accordance with one embodiment, sums a signal supplied at the output 72 of the load power monitor 56 with the signal supplied at the output 76 of the voltage loop controller 58. That is, in accordance with one embodiment, the control system employs both a feedback voltage loop control using the voltage loop controller 58 and a feedforward load power monitoring control using the load power monitor 56. Accordingly, in a version of this embodiment, the control system 18 can employ each of an error in the DC bus voltage (i.e., relative to a setpoint) and changes in instantaneous load power to control the DC bus voltage.

According to one embodiment, the divider 60 receives a signal corresponding to the result of the summation at the input 78 and a signal corresponding to an AC input voltage at the input 79. In a version of this embodiment, the divider divides the signal received at the input 78 by the signal received at the input 79 to generate a reference signal at the output 80.

In one embodiment, the input 82 receives the signal provided at the output 80 of the divider 60. In a version of this embodiment, the signal corresponds to a reference current that is supplied to the current loop controller 62. In accordance with one embodiment, the current loop controller generates a signal at its output 84 which is supplied to the input 86 of the power factor correction power stage 12. Thus, in one embodiment, a reference signal that is based at least in part on the instantaneous load power is supplied to the power factor correction power stage 12. In one embodiment, the reference signal is employed to control the operation of the power factor correction power stage, for example, to control the switching frequency of electronic switches used to connect the DC bus 14 to a power source.

The control module 18 can be implemented in hardware, software, firmware or a combination thereof. In one embodiment, the control module 18 can be implemented in a microprocessor or microcontroller executing embedded software and/or firmware instructions. According to one embodiment, one or more of the elements of the control system 18 may be provided in electronic circuitry including circuitry provided on a semiconductor chip or wafer. In various embodiments, one or more of the control elements 56, 58, 64, 60, and 62, are integrated into the same circuit or, alternatively, one or more of these may be included in a separate circuit alone or in combination with one or more of the control elements.

Further, although the control system is illustrated as having a single output connected to the power factor correction power stage 12, the control system 18 may include other inputs and outputs that are connected to the power factor correction power stage 12 or other portions of the UPS 10 including the inverter power stage 16 and the charger power stage 26. For clarity, these additional connections are not illustrated here.

Figure 3A:
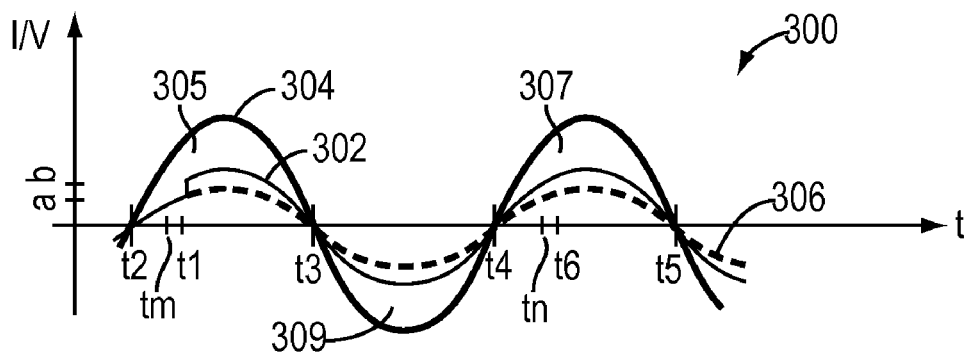
FIGS. 3A-3C are waveform diagrams in accordance with one embodiment.
Figure 3B:
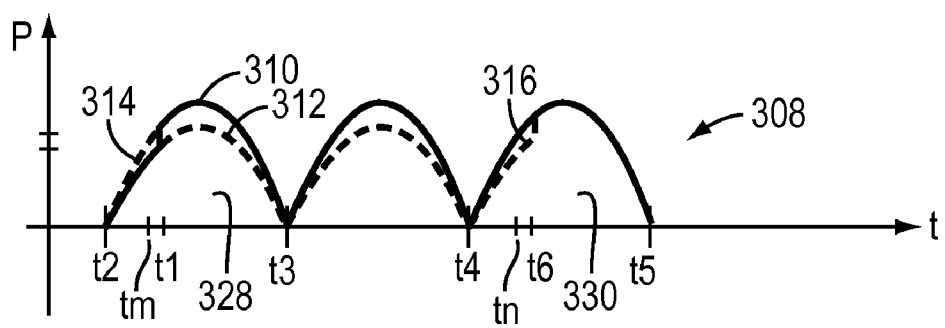
Figure 3C:
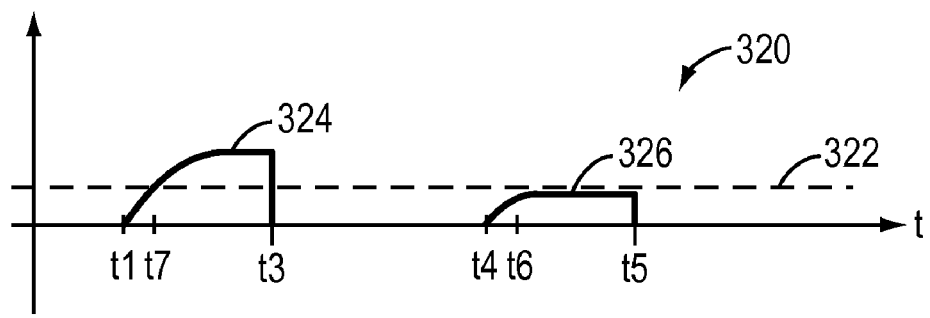

Referring now to FIGS. 3A, 3B and 3C, a series of waveform plots are illustrated which demonstrate how embodiments of the invention respond to load transients. Transients can include any rapid increase or decrease in the power supplied by the UPS, for example, an increase in electrical load caused by the starting of a fan or compressor motor.

FIG. 3A illustrates a waveform plot 300 of current and voltage at the output of the UPS. FIG. 3B illustrates a waveform plot 308 of the instantaneous load power at the output of the UPS. FIG. 3C illustrates a waveform plot 320 of a cumulative difference in instantaneous load power as is explained in greater detail below.

Referring to FIG. 3A, a waveform plot 300 includes a current waveform 302 and a voltage waveform 304. In addition, the waveform plot 300 illustrates a load transient at time T1 that is reflected in the current waveform 302. In this example, the load transient is an increase in load. However, embodiments of the invention may also operate in response to rapid decreases in electrical load. In order to highlight the operation of the UPS 10, the original current waveform 306 is illustrated in phantom for the period following the time T1. Accordingly, the waveform 306 illustrates a steady-state current while the waveform 302 illustrates a current that changes in magnitude at the time T1. In the illustrated example, the load transient occurs substantially instantaneously, e.g., the load transient is a step increase in load. Further, as illustrated, the load transient causes an increase in the current supplied to the load which is reflected by the change in the current waveform, i.e., the step change, that appears in the waveform plot 300.

In this example, the load transient occurs during a first positive half cycle 305. The subsequent positive half cycle 307 (e.g., the immediately following positive half cycle) and the subsequent negative half cycle 309 are also identified in the waveform plot 300.

As illustrated in FIGS. 3A-3C, the load transient occurs at the time T1, a first zero crossing occurs at the time T2 and the end of the first positive half cycle is indicated by a second zero crossing at a time T3. A completion of the negative half cycle 309 and the start of the subsequent positive half cycle 307 is indicated by the zero crossing occurring at the time T4, and the completion of the subsequent positive half cycle 307 is indicated by the zero crossing occurring at the time T5. The time T6 represents the time of the subsequent positive half cycle 307 that follows the positive half cycle 305 where the load transient first occurs.

Further, the waveform 316 illustrated in FIG. 3B corresponds to the power waveform prior to the load transient and is shown in phantom for reference at the positive half cycle 307. Accordingly, the time T6 represents a point of the positive cycle 307 that corresponds to the time T1 of the first positive half cycle 305. That is, the amount of time between the zero crossing that occurs at the time T2 and the occurrence of the load transient as indicated by the time T1 equals the amount of time between the zero crossing occurring at the time T4 and the time T6.

In accordance with one embodiment, the control system 18 of the UPS 10 is responsive to rapid changes in loading of the AC output 63 because the control system 18 employs load power monitoring via the load power monitor 56. As will be explained in greater detail herein, in accordance with one embodiment, a signal may appear at the output 72 of the load power monitor 56 only for load power transients (either increases or decreases) of sufficient magnitude as determined by the control system 18. Thus, the signal supplied to the node 64 from the output 72 of the load power monitor 56 can be zero during many stages of operation, e.g., steady state loading or small fluctuations in load, etc.

Referring to FIG. 3B, a waveform plot 308 illustrates a plot of the power 310 provided at the output 63 of the UPS 10. In addition, a waveform 312 corresponding to the original power as it would have existed without the load transient is also illustrated in phantom. Further, for clarity, another portion of the waveform 314 is shown in phantom from the zero crossing occurring at the time T2 to the time T1 where the load transient occurs.

Various embodiments may employ load power monitoring in the control system to provide a rapid response to load transients. In the illustrated embodiment, the UPS 10 provides rapid regulation for the voltage of the DC bus 14 by determining a difference in the instantaneous load power over a plurality of samples of the waveform for successive half cycles that have the same polarity. That is, in general, embodiments of the invention, compare a point on the positive half cycle of an AC waveform with the instantaneous load power of the same point on the immediately subsequent half cycle that has the same polarity, e.g., the comparison of instantaneous load power is made between a first positive half cycle and a subsequent positive half cycle and/or instantaneous load power is compared between a first negative half cycle and a subsequent negative half cycle. In various embodiments, the UPS responds to changes in the loading of the AC output 63 in substantially less than one-half a line cycle using the preceding approach. In one embodiment, the response time is less than or equal to 250 microseconds. In another embodiment, the response time is less than or equal to 500 microseconds.

In further embodiments, the difference in instantaneous load power at various points in time of the two successive half cycles having the same polarity is accumulated and compared with a predetermined threshold. In one embodiment, a signal is supplied at the output 72 of the load power monitor when the cumulative difference in instantaneous load power between successive periods exceeds the predetermined threshold. In a further embodiment, a signal is not supplied at the output 72 unless the cumulative difference in instantaneous load power between successive periods exceeds the predetermined threshold.

In accordance with another embodiment, the load power monitor adds the instantaneous power supplied at the output 54 of the charger 26 to the instantaneous load power at the output 63 to determine a total instantaneous power supplied by the UPS 10. According to this embodiment, the difference in the total instantaneous load power during successive half cycles of the AC output (having the same polarity) is determined, accumulated and compared with a predetermined threshold. In a version of this embodiment, a signal is supplied at the output 72 of the load power monitor when the cumulative difference in the total instantaneous load power exceeds the predetermined threshold. Although the following description refers to the instantaneous load power (i.e., determined based on the input 70 of the load power monitor 56), a determination of the total instantaneous power may also be employed (i.e., determined based on both the input 68 and the input 70 of the load power monitor 56).

Figure 4A:
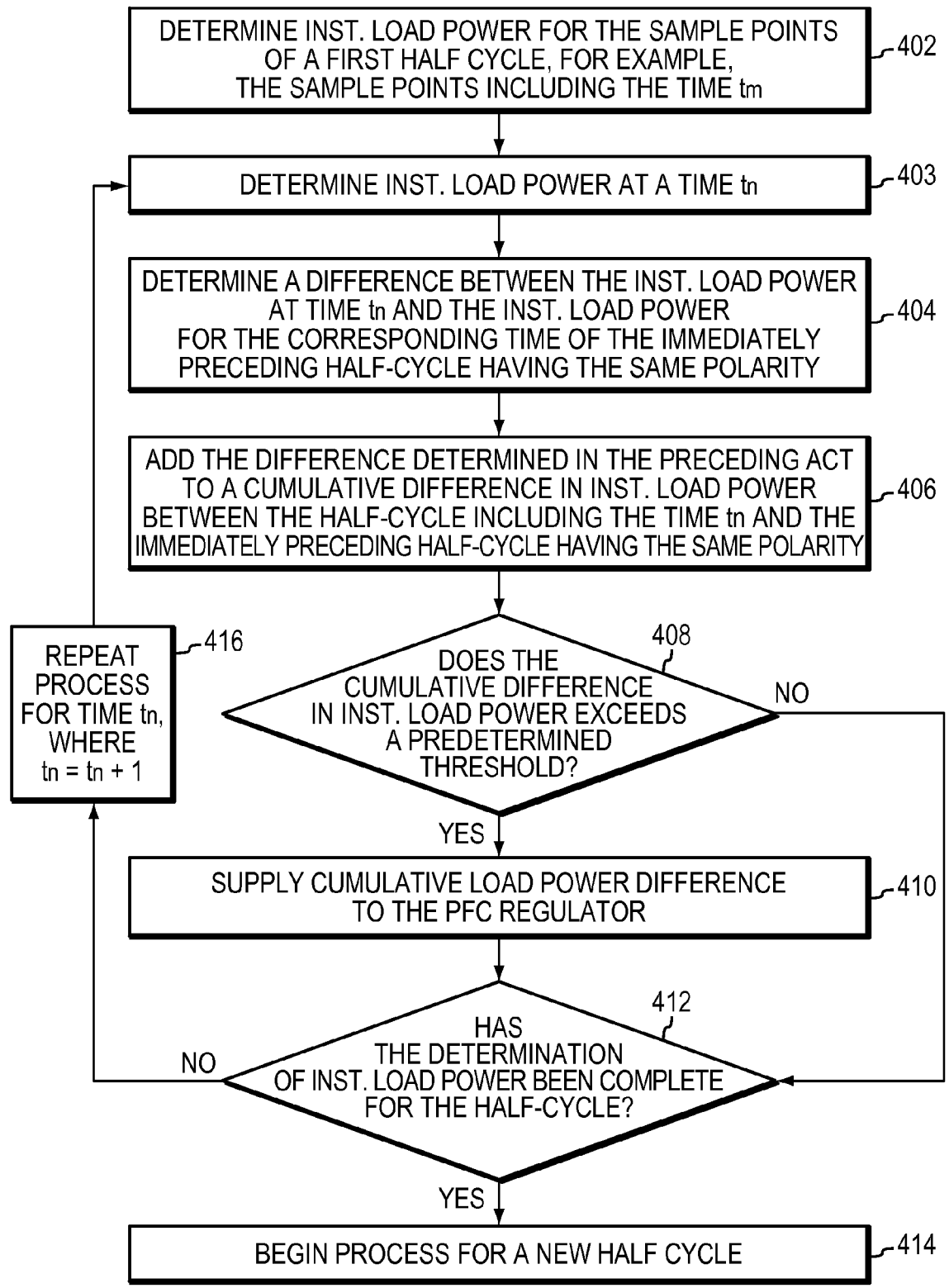
FIGS. 4A and 4B are flow diagrams in accordance with one embodiment.

FIG. 4A illustrates a process 400 that employs a difference in instantaneous load power in accordance with one embodiment. In one embodiment, the load power monitor 56 samples the voltage and the current of each line cycle a predetermined quantity of times. In one embodiment, each line cycle is sampled at 64 points in time. Accordingly, the time $t_m$ and the time $t_n$ are representative of a sample point from the first half cycle 305 and a sample point from the subsequent positive half cycle 307, respectively. More specifically, the time $t_m$ represents a sample point between the times T2 and T1, that is, prior to the occurrence of the load transient. Further, the time $t_m$ occurs a known amount of time after the zero crossing that begins the first positive half cycle 305 of the waveform 310, i.e., a known time after the time T2. That is, an amount of time X occurs between the time T2 and the time $t_m$, i.e., $t_m-T2=X$. Accordingly, the time $t_n$ is selected as a time that occurs the same amount of time (i.e., the quantity X) after the zero crossing that begins the subsequent positive half cycle 307 of the waveform 310, that is, $t_n-T4=X$.

Employing this example, the instantaneous load power at the time $t_m$ is determined at stage 402. According to one embodiment, the determination of the instantaneous load power for each sample of the first positive half cycle 305 is determined in advance of stage 403. At stage 403, the instantaneous load power at the time $t_n$ is determined. At stage 404, a difference between the instantaneous load power at the time $t_m$ and the instantaneous load power at the time $t_n$ is determined. That is, in accordance with one embodiment, the difference determined at the stage 404 is a difference between the instantaneous load power determined at sample points that occur at the same relative point of time in the two half cycles.

As mentioned previously, a cumulative difference in instantaneous load power between subsequent half cycles having the same polarity is employed in some embodiments. At stage 406, the difference determined at stage 404 is added to a cumulative difference in instantaneous load power between the subsequent half cycles, e.g., between the first positive half cycle 305 and the subsequent positive half cycle 307. Also, as mentioned previously, the cumulative difference in instantaneous load power is compared with a predetermined threshold in some embodiments.

At stage 408, the cumulative difference in instantaneous load power is compared to a predetermined threshold to determine whether the cumulative difference in instantaneous load power exceeds the predetermined threshold. Where the cumulative load power difference exceeds the predetermined threshold, the process 400 moves to stage 410 where the cumulative load power difference is supplied to the output 72 of the load power monitor 56, e.g., a signal corresponding to the cumulative load power difference is generated at the output 72 of the load power monitor 56.

At stage 412, a determination is made whether the sampling has been completed for the current half cycle that is being evaluated. In accordance with one embodiment, if the sampling is complete for the current half cycle, the cumulative load power difference is reset to zero and the process begins again for the subsequent half cycle having the same polarity, at stage 414. As is also illustrated in FIG. 4A, the process 400 moves from the stage 408 to the stage 412, in some embodiments, where the cumulative difference in instantaneous load power does not exceed the predetermined threshold. If, at the stage 412, it is determined that the sampling is not complete for the current half cycle the process moves to stage 416. At stage 416, the process is repeated for the immediately subsequent sample time, e.g., for times $t_m = t_{m+1}$ and corresponding time $t_n = t_{n+1}$. Accordingly, the process returns to the stage 403. As described here, the process will continue until the sampling and analysis for a defined period of the waveform, e.g., a half cycle, is completed.

The process 400 may include various modifications that will be apparent to those of ordinary skill in the art. For example, the process 400 may be implemented for both positive half cycles and negative half cycles. That is, the process will be continuous for each cycle where the instantaneous load power of positive half cycles is compared with the instantaneous load power of other positive half cycles and the instantaneous load power of negative half cycles is compared with the instantaneous load power of other negative half cycles in the manner generally described herein.

Embodiments of the invention may be employed with a variety of styles and types of power conversion circuitry in general and UPSs in particular. According to one embodiment, the process 400 is employed with a UPS that includes a dual DC bus, for example, where each of the positive DC bus and the negative DC bus are each referenced to a neutral. According to another embodiment, the process 400 is employed with a UPS that includes a single DC bus, for example, a UPS in which the positive DC bus and the negative DC bus are not referenced to a neutral.

Referring now to FIG. 3C, a waveform plot 320 of the cumulative difference in instantaneous load power is illustrated. The waveform plot includes a predetermined threshold 322 shown as a dashed line, a first period 324 in which a load transient is detected and a second period 326 in which a load transient is detected.

The instantaneous load power has a positive value as reflected in the waveform plot 308. Accordingly, in FIG. 3B, the region of the power waveform 310 that corresponds to the positive half cycle 305 of the waveform plot 300 is identified as the region 328 and the region that corresponds to the positive half cycle 307 is identified as the region 330.

In FIG. 3B, the waveform 312 reflects the instantaneous load power of the positive half cycle that immediately preceded the half cycle 328. Because each of the half cycle 328 and the preceding half cycle 312 has the same magnitude from the time T2 to the time T1, the value of the cumulative difference in instantaneous load power is zero prior to the time T1. At the time of the load transient (i.e., the time T1), a comparison of the instantaneous load power of the half cycle 328 with the immediately preceding positive half cycle (represented by the waveform 312) finds that the instantaneous load power is greater in the half cycle 328. Thus, beginning at the time T1, a cumulative difference in instantaneous load power results from the difference between the instantaneous load power of the waveform 328 and the waveform 312. Because the instantaneous load power of the half cycle 328 remains greater (i.e., the increased load remains), the cumulative difference steadily increases until the zero crossing is reached at the time T3.

In accordance with one embodiment, the control system 18 compares the cumulative difference in instantaneous load power 324 with the predetermined threshold 322. According to one embodiment, the load power monitor performs the comparison. In the illustrated example, a signal is generated at the output 72 of the load power monitor 56 at the time T7 because that is the time at which the cumulative difference in instantaneous load power exceeds the predetermined threshold 322. Further, in the illustrated embodiment, the signal is generated at the output 72 for the remainder of the period of the positive half cycle 305.

In FIG. 3C, this cumulative load power difference for the subsequent positive half cycle is illustrated by the plot 326. At the time T4, the difference in instantaneous load power between the waveform 330 and the waveform 316 begins to accumulate until the time T6 at which there are no further additions to the cumulative load power for that half cycle (i.e., provided that no further load transients occur). That is, beginning at the time T1, the half cycle 328 includes the change in instantaneous load power caused by the transient. This change is also reflected in the waveform 330. Consequently, there is no difference in instantaneous load power.

Figure 4B:
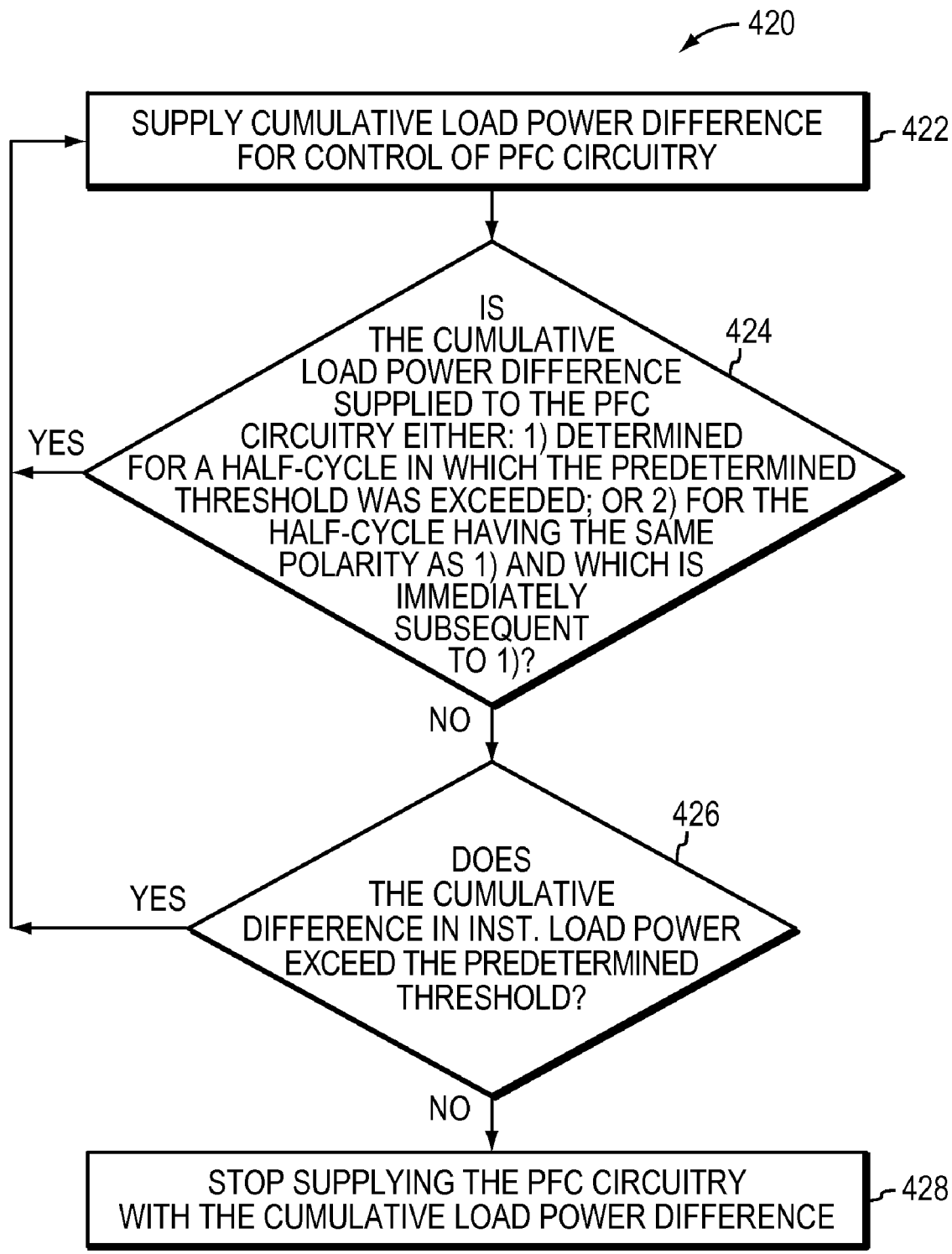

Referring now to FIG. 4B, a process 420 is illustrated which may be integrated into the overall process 400. In accordance with one embodiment, the process 420 is integrated into the overall process 400 following stage 410. At stage 422, a determination has been made to supply a cumulative load power difference to the output 72. That is, the portion of the control system 18 that controls the operation of the power factor correction power stage. However, at stage 424, the determination to supply the difference is further evaluated. In accordance with one embodiment, the cumulative load power difference continues to be used to control operation of the power factor correction power stage if either the cumulative load power difference is determined for a half cycle in which the predetermined threshold was exceeded or for the immediately subsequent half cycle having the same polarity as the half cycle in which the predetermined threshold was exceeded. However, if neither of those two criteria are met, at stage 424, the process 420 moves to the stage 426 where a determination is made whether the cumulative difference in instantaneous load power exceeds the predetermined threshold. If it does, the cumulative load power difference continues to be used to control operation of the power factor correction power stage. If it is not, the cumulative difference in instantaneous load power is no longer used to control operation of the power factor correction power stage as indicated at stage 428. That is, in one embodiment, the load power monitor 56 stops supplying a signal at the output 72 at stage 428.

In accordance with one embodiment, a predetermined threshold is established based on the expected fluctuation in the nonlinear loads supplied by the UPS 10. In various embodiments other factors considered in selecting a predetermined threshold include the resolution of the measurements, i.e., how many sample points are selected per line cycle, signal noise experienced in the measurements. In a version of this embodiment, the predetermined threshold is established so that it is greater than the contribution of these extraneous fluctuations in instantaneous power. In one embodiment, the predetermined threshold is set to 200 watts. In a further embodiment, the predetermined threshold is established as a percentage of the full load power. In a version of this embodiment, the predetermined threshold is established as approximately 5-6% of the full load power.

As mentioned above, embodiments can be employed to provide improved transient response of the DC bus voltage. In various embodiments, the sampling frequency is selected to control the response time. For example, a faster sampling rate (samples/cycle) can result in a faster detection of load transients which allows for faster transient response of the DC bus and a corresponding reduction in overshoot and undershoot of the DC bus voltage.

Embodiments of the instantaneous load power profiling system and method described herein may be employed with single phase or three phase systems. For example, embodiments can be used where the loading of a three phase system is not balanced and/or the load is non-linear because the line cycle will also include an AC component. Thus, embodiments can be used for polyphase applications including hybrid systems such as those that include a 3 phase AC supply to an input of the UPS and single phase UPS output.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of controlling a voltage of a DC bus included in an uninterruptible power supply ("UPS"), the UPS including power factor control circuitry coupled to the DC bus, and an AC output, the method comprising acts of:
    determining a difference between instantaneous power supplied to the AC output at a first time occurring during a first cycle of an AC waveform provided at the AC output and instantaneous power supplied to the AC output at a second time occurring during a second cycle of the AC waveform that is subsequent to the first cycle; and
    adjusting an operation of the power factor control circuitry to adjust the voltage of the DC bus based, at least partly, on the difference.

2. The method of claim 1, wherein the first time occurs subsequent to a start of the first cycle by a first amount of time, and wherein the second time occurs subsequent to a start of the second cycle by a second time that is substantially equal to the first amount of time.

3. The method of claim 1, further comprising acts of selecting the first time as a time that occurs during a first positive half-cycle of the AC waveform; and selecting the second time as a time that occurs during a positive half-cycle that is immediately subsequent the first positive half-cycle.

4. The method of claim 1, further comprising an act of controlling a power factor of a single phase AC input of the UPS.

5. The method of claim 1, further comprising an act of determining a cumulative difference in instantaneous power supplied at the AC output.

6. The method of claim 5, further comprising an act of providing the cumulative difference to the power factor control circuitry.

7. The method of claim 5, further comprising an act of comparing the cumulative difference to a predetermined threshold.

8. The method of claim 7, further comprising an act of adjusting the operation of the power factor control circuitry to adjust the voltage of the DC bus when the cumulative difference exceeds the predetermined threshold.

9. The method of claim 7, wherein the UPS includes charging circuitry configured to charge an energy storage device, wherein the charging circuitry includes a DC output, and wherein the method further comprises acts of:
    determining a first sum as a sum of the instantaneous power supplied to the AC output and instantaneous power supplied to the DC output at the first time;
    determining a second sum as a sum of the instantaneous power supplied to the AC output and instantaneous power supplied to the DC output at the second time; and
    determining the cumulative difference based on a difference between the first sum and the second sum.

10. The method of claim 7, further comprising an act of generating a reference current signal using the cumulative difference.

11. The method of claim 1, further comprising acts of:
    determining an error in the voltage of the DC bus, and
    controlling the voltage using each of the error and the cumulative difference.

12. The method of claim 1, further comprising an act of adjusting the operation of the power factor control circuitry in an amount of time that is substantially less than one-half cycle of the AC waveform following a substantially instantaneous change in load power greater than a predetermined threshold.

13. An uninterruptible power supply ("UPS") comprising:
    an AC output;
    power factor control circuitry; and
    a DC bus coupled to the power factor control circuitry,
    wherein the power factor control circuitry is configured to determine a difference between instantaneous power supplied to the AC output at a first time occurring during a first cycle of an AC waveform provided at the AC output and at a second time occurring during a second cycle of the AC waveform that is subsequent to the first cycle, and
    wherein the power factor control circuitry is configured to adjust a voltage of the DC bus based, at least partly, on the difference.

14. The UPS of claim 13, further comprising a single phase AC input.

15. The UPS of claim 13, wherein the power factor control circuitry is configured to determine a cumulative difference in instantaneous power supplied to the AC output.

16. The UPS of claim 15, wherein the cumulative difference is determined based on a comparison of instantaneous power determined at a plurality of points in a first cycle of the AC waveform and instantaneous power determined at a plurality of points in a second cycle of the AC waveform.

17. The UPS of claim 15, wherein the power factor control circuitry is configured to compare the cumulative difference to a predetermined threshold.

18. The UPS of claim 17, wherein the power factor control circuitry is configured to adjust the operation of the UPS when the cumulative difference exceeds the predetermined threshold.

19. The UPS of claim 15, wherein the power factor control circuitry is configured to generate a reference current signal using the cumulative difference.

20. The UPS of claim 19, wherein the power factor control circuitry includes voltage loop control circuitry, and wherein the power factor control circuitry is configured to generate the reference current signal using a signal generated by the voltage loop control circuitry.

21. The UPS of claim 13, further comprising charging circuitry configured to charge an energy storage device, wherein the charging circuitry includes a DC output, and wherein the power factor control circuitry is configured to determine a difference in a total instantaneous power supplied to the AC output and the DC output and to adjust the operation of the UPS based, at least partly, on the difference in the total instantaneous power.

22. The UPS of claim 13, further comprising a polyphase AC input.

23. The UPS of claim 13, further comprising an inverter having an input coupled to the DC bus and an output coupled to the AC output.

24. The UPS of claim 13, wherein a response time of the power factor control circuitry to adjust the voltage of the DC bus is an amount of time that is substantially less than one-half cycle of the AC waveform following a substantially instantaneous change in load power greater than a predetermined threshold.

25. An uninterruptible power supply ("UPS") comprising:
a DC bus;
an AC output;
power factor correction circuitry coupled to the DC bus; and
means for controlling operation of the power factor correction circuitry to control a voltage of the DC bus based on a difference which is determined between instantaneous power supplied to the AC output at a first time occurring during a first cycle of an AC waveform and instantaneous power supplied to the AC output at a second time occurring during a second cycle of the AC waveform that is subsequent to the first cycle.

26. The UPS of claim 25, further comprising an inverter having an input coupled to the DC bus and an output coupled to the AC output.

27. The UPS of claim 25, further comprising a single phase AC input.

28. The UPS of claim 25, wherein the means for controlling include means for determining a cumulative difference in instantaneous power supplied to the AC output.

29. The UPS of claim 28, wherein the cumulative difference is determined based on a comparison of instantaneous power determined at a plurality of points in a first cycle of the AC waveform and instantaneous power determined at a plurality of points in a second cycle of the AC waveform.

30. The UPS of claim 28, wherein the means for controlling includes means for comparing the cumulative difference to a predetermined threshold.

31. The UPS of claim 30, wherein the means for controlling includes means for adjusting the operation of the UPS when the cumulative difference exceeds the predetermined threshold.

32. The UPS of claim 28, wherein the means for controlling includes means for generating a reference current signal using the cumulative difference.

33. The UPS of claim 32, wherein the means for controlling includes voltage loop control circuitry, and wherein the means for controlling is configured to generate the reference current signal using signal generated by the voltage loop control circuitry.

34. The UPS of claim 25, further comprising charging circuitry configured to charge an energy storage device, wherein the charging circuitry includes a DC output, and wherein the means for controlling is configured to determine a difference in a total instantaneous power supplied to the AC output and the DC output and to adjust the operation of the UPS based, at least partly, on the difference in the total instantaneous power.

35. The UPS of claim 25, further comprising a polyphase AC input.

* * * * *